(12) United States Patent
Smith et al.

(10) Patent No.: US 8,130,742 B2
(45) Date of Patent: Mar. 6, 2012

(54) COMMUNICATION PROTOCOL FOR A WIRELESS DEVICE AND A GAME CONSOLE

(75) Inventors: Gregory Ray Smith, Bellevue, WA (US); David Russo, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1229 days.

(21) Appl. No.: 11/763,935

(22) Filed: Jun. 15, 2007

(65) Prior Publication Data

US 2008/0311988 A1 Dec. 18, 2008

(51) Int. Cl.
*H04B 7/212* (2006.01)
*H04W 4/00* (2009.01)

(52) U.S. Cl. ......... 370/347; 370/329; 370/337; 370/442

(58) Field of Classification Search .................. 370/328, 370/329, 336, 337, 345, 347, 442
See application file for complete search history.

(56) References Cited

U.S. PATENT DOCUMENTS

| | | | |
|---|---|---|---|
| 6,415,439 B1 | 7/2002 | Randell et al. | 725/153 |
| 6,519,255 B1* | 2/2003 | Graves | 370/392 |
| 7,151,763 B2 | 12/2006 | Koch et al. | 370/338 |
| 7,843,905 B2* | 11/2010 | Beshai | 370/376 |
| 2002/0006137 A1* | 1/2002 | Rabenko et al. | 370/466 |
| 2002/0057678 A1 | 5/2002 | Jiang et al. | 370/353 |
| 2002/0095293 A1 | 7/2002 | Gallagher et al. | 704/270 |
| 2002/0138850 A1* | 9/2002 | Basil et al. | 725/117 |
| 2002/0141355 A1* | 10/2002 | Struhsaker et al. | 370/280 |
| 2003/0002635 A1 | 1/2003 | Koch et al. | 379/88.17 |
| 2003/0081577 A1* | 5/2003 | Jimenez | 370/336 |
| 2004/0225565 A1 | 11/2004 | Selman | 705/14 |
| 2004/0267951 A1* | 12/2004 | Hattori | 709/231 |
| 2005/0282536 A1 | 12/2005 | McClure et al. | 455/422.1 |
| 2006/0083199 A1 | 4/2006 | Yang | 370/331 |
| 2006/0234631 A1 | 10/2006 | Dieguez | 455/41.2 |
| 2006/0256819 A1 | 11/2006 | Lum et al. | 370/493 |
| 2008/0031453 A1* | 2/2008 | Pedersen | 380/270 |
| 2008/0080423 A1* | 4/2008 | Kolding et al. | 370/329 |

OTHER PUBLICATIONS

Akkawi, A. et al., "A Mobile Gaming Platform for the IMS", *SIGCOMM*, 2004, http://delivery.acm.org, 77-84.
Noether, A., "Introduction to Wireless Technology and the IBM WebSphere Everyplace Suite", Mar. 1, 2001, http://www-128.ibm.com, 6 pages.

* cited by examiner

*Primary Examiner* — Ronald Abelson
(74) *Attorney, Agent, or Firm* — Woodcock Washburn LLP

(57) ABSTRACT

An accessory is provided wireless connectivity with a game console by reconfiguring an earlier transport format that was used to solely transport voice data packets. The reconfiguration incorporates the use of a hybrid sub-frame, wherein voice data packets are replaced with communication data packets. The replacement is indicated by a set of identification bits inserted into a payload identifier field of the hybrid sub-frame.

18 Claims, 7 Drawing Sheets

COMMUNICATION PROTOCOL FOR A WIRELESS DEVICE AND A GAME CONSOLE

TECHNICAL FIELD

The technical field generally relates to a wireless communication system and more specifically relates to a communication system for providing communications between a wireless headset unit and a game console.

BACKGROUND

In gaming systems there is a strong demand for eliminating cumbersome and restrictive cables and replacing these cables with a wireless communication system that provides interactivity between a game console and a variety of peripheral devices. Some of the peripheral devices are relatively smart devices that have the capacity to communicate both data and voice over wireless links. However, certain peripheral devices such as a wireless headset for example, have limited communication capabilities for interacting with the game console. The limited communication capabilities are designed into these so-called dumb peripherals for a variety of reasons. Two amongst such reasons include minimizing cost and minimizing package size.

Typically, a wireless headset is an audio device designed to reproduce sound signals and is therefore designed primarily with audio band communications in mind. However, in certain applications it may be discovered at a later date that some desirable product features require transferring data signals between the headset and the game console in addition to the audio signals. One option for implementing such additional features would be to replace existing headsets and/or game consoles. However, as can be appreciated, this solution can turn out to be very expensive.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Provided herein, are communication systems and methods for transporting control and communication data packets, in addition to voice packets, between a game console and a wireless accessory, such as a wireless headset unit. These systems and methods have been implemented by reconfiguring an existing wireless transmission protocol (which has been primarily used so far for carrying voice packets) for carrying control and communication data packets as well.

In a first embodiment, a method of communicating information between a wireless headset unit and a game console is carried out by assigning, in an upstream frame of data packets directed from the wireless headset unit to the game console, an upstream hybrid sub-frame for transportation of upstream voice data packets and communication data packets. This method further involves replacing upstream voice data packets with communication data packets, the replacement being identified by inserting a first set of identification bits in a payload identifier field of the upstream hybrid sub-frame.

In a second embodiment, a communication system includes a wireless headset unit and a game console. The wireless headset unit uses an upstream hybrid sub-frame for transportation of upstream voice data packets and communication data packets, the upstream sub-frame comprising an upstream payload identifier field configured to transport a first set of identification bits indicative of a replacement of upstream voice data packets with upstream communication data packets. The game console is configured to receive the upstream hybrid sub-frame of data packets transmitted by the wireless headset unit. The game console is further configured to transmit a downstream frame of data packets to the wireless headset unit, the downstream frame of data packets containing a downstream hybrid sub-frame for transportation of downstream voice data packets and communication data packets. The downstream hybrid sub-frame contains a downstream payload identifier field configured to transport a second set of identification bits indicative of a replacement of downstream voice data packets with downstream communication data packets.

In a third embodiment, a computer-readable medium has stored thereon, computer-executable instructions for providing communications between a wireless headset unit and a game console. This is carried out by configuring an upstream hybrid sub-frame for transportation of upstream voice data packets from the wireless headset unit to the game console. The instructions further include inserting in a payload identifier field of the upstream hybrid sub-frame, a first set of identification bits indicative of a replacement of upstream voice data packets with upstream communication data packets.

BRIEF DESCRIPTION OF THE DRAWINGS

The foregoing summary, as well as the following detailed description of example embodiments, is better understood when read in conjunction with the appended drawings. For the purpose of illustrating the communication system, there is shown in the drawings exemplary constructions; however, the system is not limited to the specific methods and instrumentalities disclosed. In the drawings.

DETAILED DESCRIPTION OF ILLUSTRATIVE EMBODIMENTS

Figure 1:
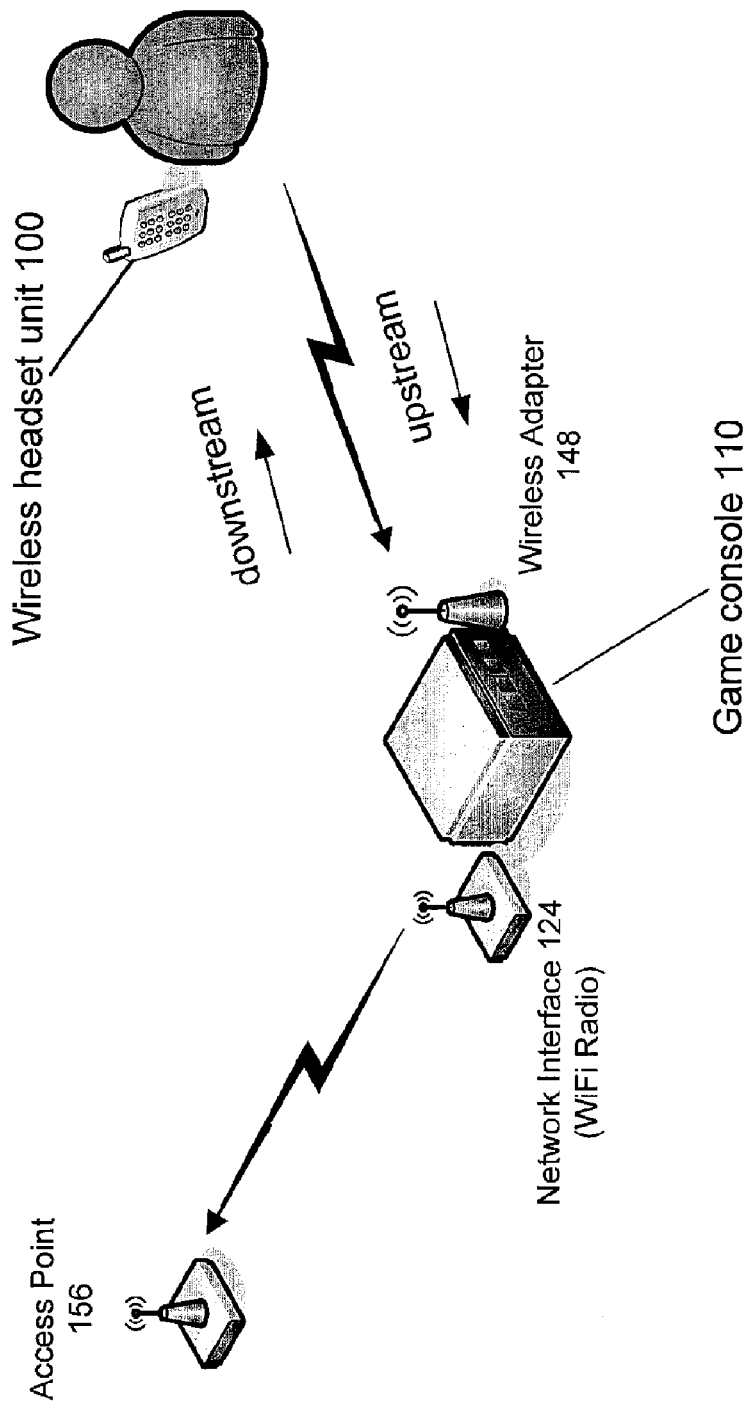
FIG. 1 is a block diagram showing a game system incorporating a game console and a wireless headset communicatively coupled to the game console.

FIG. 1 is a block diagram of an exemplary game system that includes a game console 110 communicatively coupled to an access point 156 and an accessory, which in this case is a wireless headset unit 100. The game console 110 may be configured to operate on two different radio subsystems. The first wireless system is an 802.11b/g standard compliant module (WiFi) within the network interface 124, which is used for wireless home network connectivity via an access point 156. This can be used in place of a standard Ethernet connection to add wireless networking ability to access the Internet or remote PC's. The second is a frequency-hopping spread spectrum (FHSS), low transmit power system within the wireless adapter 148 operating within the Industrial-Scientific-Medical (ISM) 2.4 GHz band. The wireless adapter 148 provides wireless connectivity between game console 110 and wireless headset unit 100.

In one application, game console 110 is an Xbox 360® coupled directly to wireless headset unit 100. In another application, the Xbox 360® is coupled to wireless headset unit 100 through a personal computer (not shown). In this case, wireless headset unit 100 is configured to wirelessly communicate with the personal computer.

Figure 2:
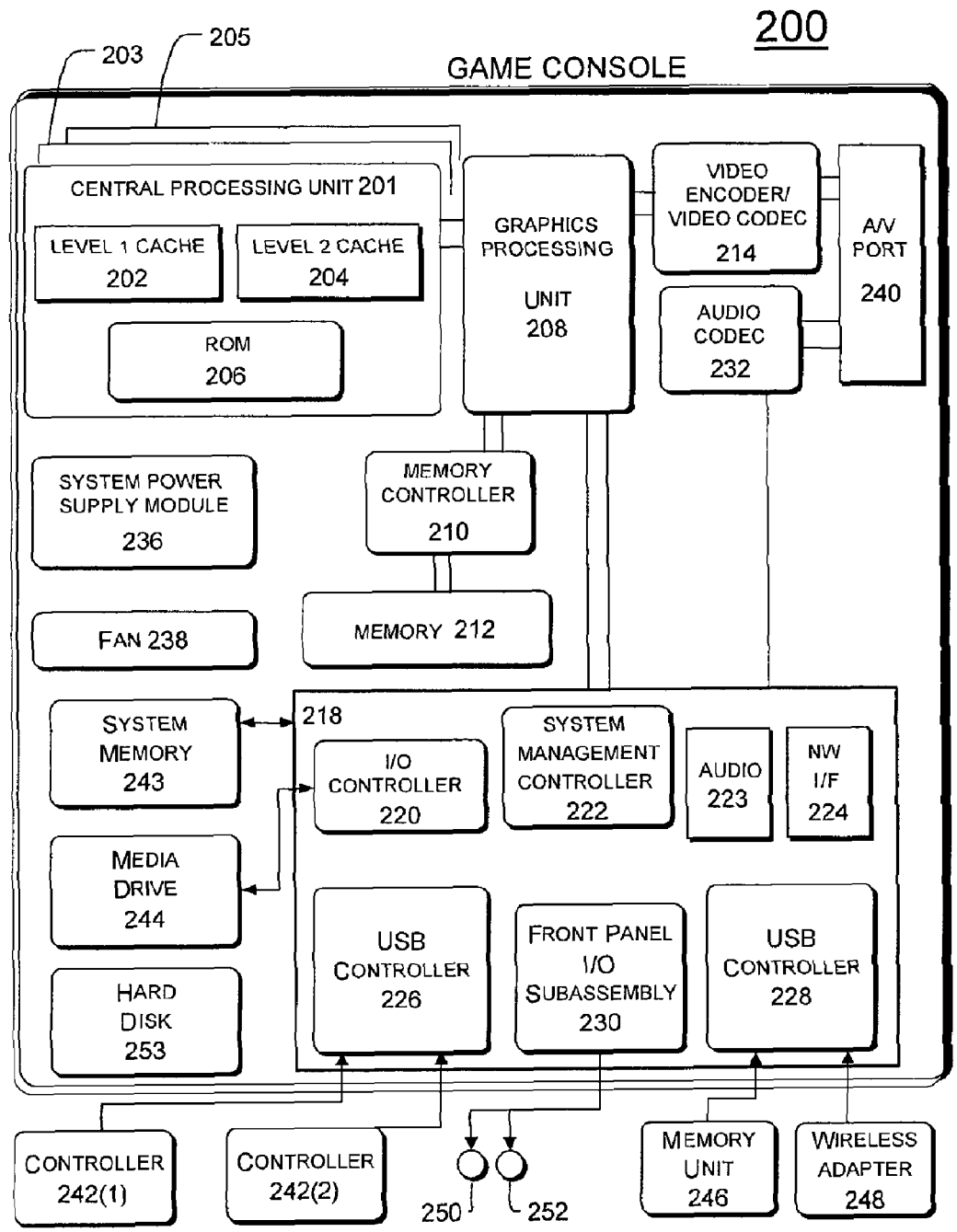
FIG. 2 illustrates a communications platform that may be used to implement a communications system between the game console and the wireless headset of FIG. 1.

FIG. 2 illustrates a communications platform 200 that may be used to implement a communications system between game console 110 and wireless headset 100. In one exemplary embodiment, communications platform 200 is incorporated entirely into console 110. In an alternative embodiment, certain portions of communications platform 200 are incorporated into wireless headset unit 100 and other portions are incorporated into game console 110. For example, certain portions associated with generation and transmission of data packets may be located in wireless headset unit 100 while corresponding receiving portions may be located in game console 110. Furthermore, some portions may be omitted in certain implementations. For example, a graphics processing unit and audio-visual ports may be omitted when communications platform 200 is incorporated into wireless headset unit 100.

In yet another alternative embodiment, certain portions of communications platform 200 are incorporated into wireless headset unit 100 and other portions are incorporated into other accessories that are communicatively coupled to game console 110. It will also be understood that certain portions of communications platform 200 may be identically replicated or implemented in slightly modified form in multiple objects such as game console 110 and wireless headset unit 100.

Communications platform 200 has a central processing unit (CPU) 201 having a level 1 cache 202, a level 2 cache 204, and a flash ROM (Read Only Memory) 206. The level 1 cache 202 and level 2 cache 204 temporarily store data and hence reduce the number of memory access cycles, thereby improving processing speed and throughput. The CPU 201 may be provided with more than one core, and thus, additional level 1 and level 2 caches 202 and 204. The flash ROM 206 may store executable code that is loaded during an initial phase of a boot process when the communications platform 200 is powered ON.

A graphics processing unit (GPU) 208 and a video encoder/video codec (coder/decoder) 214 form a video processing pipeline for high speed and high resolution graphics processing. Data is carried from the graphics processing unit 208 to the video encoder/video codec 214 via a bus. The video processing pipeline outputs data to an A/V (audio/video) port 240 for transmission to a television or other display. A memory controller 210 is connected to the GPU 208 to facilitate processor access to various types of memory 212, such as, but not limited to, a RAM (Random Access Memory).

The communications platform 200 includes an I/O controller 220, a system management controller 222, an audio processing unit 223, a network interface controller 224, a first USB host controller 226, a second USB controller 228 and a front panel I/O subassembly 230 that are implemented on a module 218. The USB controllers 226 and 228 serve as hosts for peripheral controllers 242(1)-242(2), a wireless adapter 248, and an external memory device 246 (e.g., flash memory, external CD/DVD ROM drive, removable media, etc.). The network interface 224 and/or wireless adapter 248 provide access to a network (e.g., the Internet, home network, etc.) and may be any of a wide variety of various wired or wireless adapter components including an Ethernet card, a modem, a Bluetooth module, a cable modem, and the like.

System memory 243 is provided to store application data that is loaded during the boot process. System memory 243 is one example among several alternative computer-readable media in which can be stored computer-executable instructions for providing communications between wireless headset unit 100 and game console 110.

A media drive 244 is provided and may comprise a DVD/CD drive, hard drive, or other removable media drive, etc. The media drive 244 may be internal or external to the communications platform 200. Application data may be accessed via the media drive 244 for execution, playback, etc. by the communications platform 200. The media drive 244 is connected to the I/O controller 220 via a bus, such as a Serial ATA bus or other high speed connection (e.g., IEEE 1394).

The system management controller 222 provides a variety of service functions related to assuring availability of the communications platform 200. The audio processing unit 223 and an audio codec 232 form a corresponding audio processing pipeline with high fidelity and stereo processing. Audio data is carried between the audio processing unit 223 and the audio codec 232 via a communication link. The audio processing pipeline outputs data to the A/V port 240 for reproduction by an external audio player or device having audio capabilities.

The front panel I/O subassembly 230 supports the functionality of the power button 250 and the eject button 252, as well as any LEDs (light emitting diodes) or other indicators exposed on the outer surface of the communications platform 200. A system power supply module 236 provides power to the components of the communications platform 200. A fan 238 cools the circuitry within the communications platform 200.

The CPU 201, GPU 208, memory controller 210, and various other components within the communications platform 200 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the communications platform 200 is powered ON, application data may be loaded from the system memory 243 into memory 212 and/or caches 202, 204 and executed on the CPU 201. The application may present a graphical user interface that provides a consistent user experience when navigating to different media types available on the communications platform 200. In operation, applications and/or other media contained within the media drive 244 may be launched or played from the media drive 244 to provide additional functionalities to the communications platform 200.

The communications platform 200 may be operated as a standalone system by simply connecting the system to a television or other display. In this standalone mode, the communications platform 200 allows one or more users to interact with the system, watch movies, or listen to music. However, with the integration of broadband connectivity made available through the network interface 224 or the wireless adapter 248, the communications platform 200 may further be operated as a participant in a larger network community.

When the communications platform 200 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation is large enough to contain the launch kernel, concurrent system applications and drivers. The CPU reservation is constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay scales with screen resolution. Where a full user interface is used by the concurrent system application, it is to use a resolution independent of application resolution. A scaler may be used to set this resolution such that the need to change frequency and cause a TV resynch is eliminated.

After the communications platform 200 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are scheduled to run on the CPU 201 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 242(1) and 242(2)) are shared by gaming applications and system applications. The input devices are not reserved resources, but are to be switched between system applications and the gaming application such that each will have a focus of the device. The application manager controls the switching of input stream, without knowledge the gaming application's knowledge and a driver maintains state information regarding focus switches.

Figure 3:
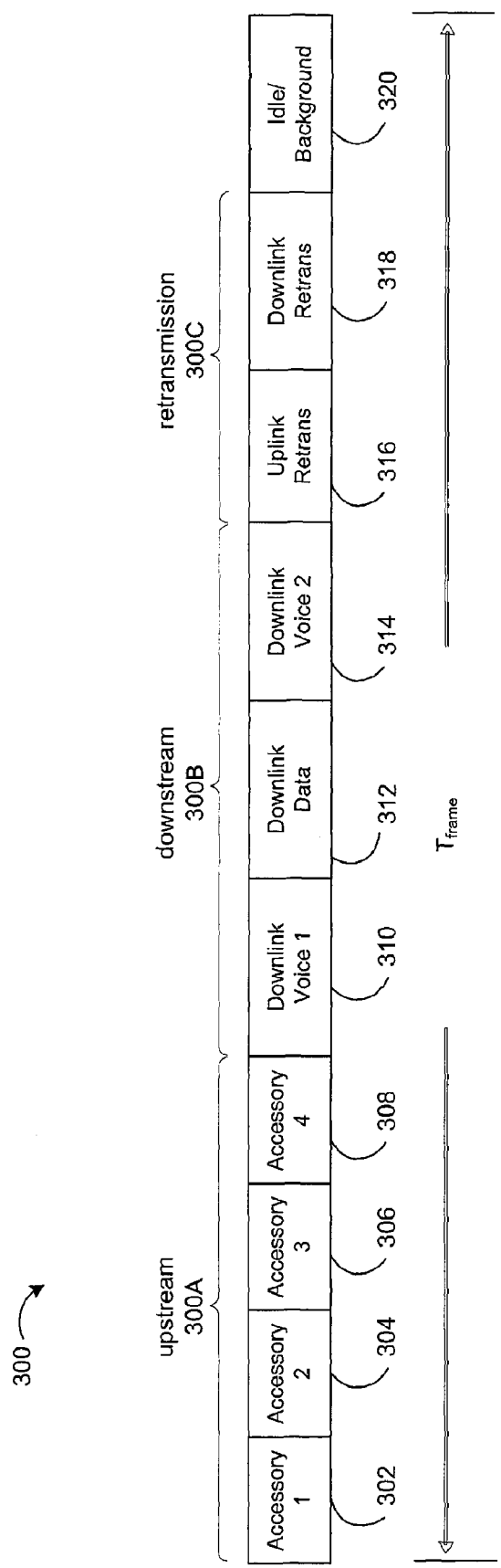
FIG. 3 illustrates a packet frame in accordance one exemplary embodiment.
Figure 4:
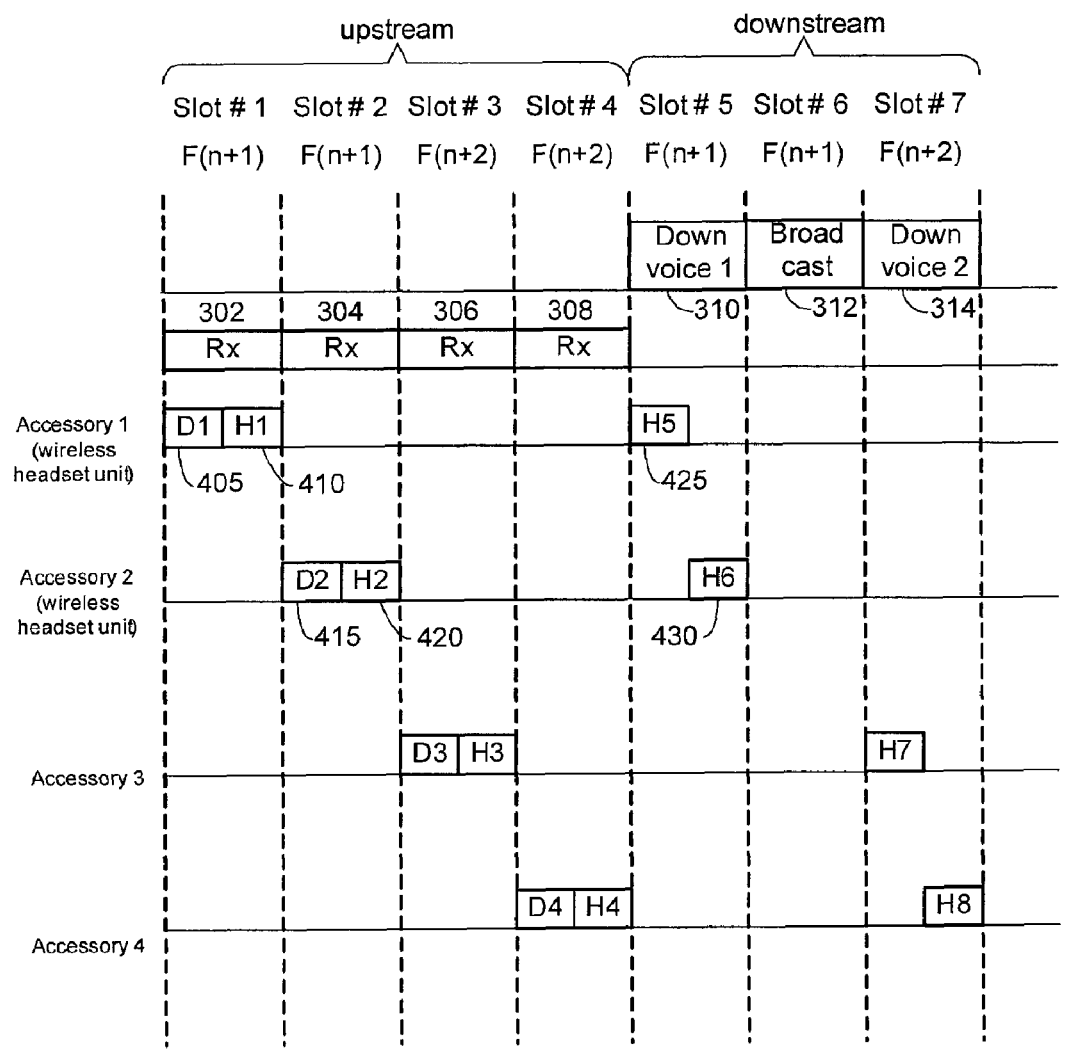
FIG. 4 illustrates the contents of the packet frame of FIG. 3.

Referring to FIG. 3 and FIG. 4, there is shown an exemplary packet frame with the protocol framework as used earlier and the reconfiguration that is being carried out for transporting communications data packets in addition to the voice data packets when the accessories are dumb devices. Reference is hereby drawn to a pending application Ser. No. 11/126,023, titled "Gaming Console Wireless Protocol for Peripheral Devices" filed on May 10, 2005, which is incorporated herein by reference in its entirety. The pending application provides further particulars about the packet frame and protocol formats used in existing systems. Several aspects of this format have been left unchanged. Consequently, in the interests of brevity, material that is not directly pertinent to the reconfiguration will not be repeated herein so as to avoid distraction.

The protocol framework 300 is a TDMA system through which the host (e.g., game console 110) and device (e.g., headset unit 100) switch between transmitting and receiving based on a fixed time interval shown as $T_{frame}$. As will be described below, the protocol 300 enables up to eight accessories (four data and four voice) to simultaneously communicate to the game console 110. In addition, the protocol 300 provides for a mix of error correction and the use of frequency hopping techniques to provide for robust communication with minimal latency. The protocol 300 is divided into three sections, section 300A for upstream data packets 302-308, section 300B for downstream data packets 310-314, and section 300C for retransmission packets 316-318. Of these sections, the upstream and downstream sections 300A and 300B, which have been reconfigured, will be described below in greater detail.

Referring now to FIG. 4, there is illustrated the frame structure of the protocol 300 in the time domain. Inside each frame, there are several slots. The frequency allocation for each of the first 7 slots is shown below in Table 1. In the table, n represents the entry for the current frame in the FHSS sequence, and F(n) is the channel that is mapped to this entry n and therefore the channel selected for this frame.

TABLE 1

| Slot # | Slot Description | Channel |
|---|---|---|
| 0 | Upstream data and voice from accessory 1 | F(n + 1) |
| 1 | Upstream data and voice from accessory 2 | F(n + 1) |
| 2 | Upstream data and voice from accessory 3 | F(n + 2) |
| 3 | Upstream data and voice from accessory 4 | F(n + 2) |
| 4 | Downstream voice to accessories 1 and 2 | F(n + 1) |
| 5 | Broadcast | F(n + 1) |
| 6 | Downstream voice to accessories 3 and 4 | F(n + 2) |

As will become evident to those of ordinary skill in the art, each accessory and/or voice-enabled device receives and transmits packets in a similar fashion, however at its appropriate time slot in accordance with the TDMA structure of the protocol 300. As such, the following description will be made with reference to accessory 1, but it applies to each of accessories 2-4, as shown in FIG. 4.

In the earlier format, at time slot F(n+1), a smart accessory 1 used sub-frame 405 (D1) for transporting communication data packets and sub-frame 410 (designated earlier as V1) for transporting voice data packets. On the other hand, a dumb device, which used sub-frame 410 for transporting voice data packets did not have a mechanism for transporting data. In the current reconfiguration, sub-frame 405 (D1) is still left unused by the dumb device. However, sub-frame 410 has now been reconfigured to carry communication data packets in addition to voice data packets. Hence, for purposes of description, sub-frame H1 (as well as other similar sub-frames designated by the prefix "H")) are now referred to as hybrid sub-frames because each sub-frame is reconfigured to carry voice as well as communication data packets in a time-shared hybrid format. The process of sharing a single sub-frame for transmitting voice data packets as well as communications data packets will be described below in greater detail.

When accessory 1 is the wireless headset unit 100, which is understandably a relatively dumb accessory, sub-frame 410 (H1) is left unused. In the upstream direction, wireless headset unit 100 transmits voice data packets and communications data packets towards game console 110 in hybrid sub-frame 410 (H1). The game console 110 ignores data sub-frame 405 when communicating with dumb devices—hence the need to transmit communications data over hybrid sub-frame 410 instead. In the downstream direction, game console 110 transmits voice data packets and communications data packets towards wireless headset unit 110, in hybrid sub-frame 425 (H5).

In a similar manner, accessory 2, which may be a second wireless headset unit (not shown) transmits voice or communications data inserted into hybrid sub-frame 420 (H2) towards the game console in the upstream direction. In the downstream direction, game console 110 transmits voice data packets and communications data packet towards the wireless headset unit in hybrid sub-frame 430 (H6). Sub-frame 415 (D2) is left unused.

Furthermore, when accessories 3 and 4 are dumb peripherals, hybrid sub-frames H3 and H4 are used for transmitting voice and communication data packets in hybrid format.

The game console 110 uses slot #6 for simultaneously broadcasting data packets to all accessories. However, this aspect is not directly pertinent in the current context and will consequently, not be elaborated upon herein.

Figure 5:
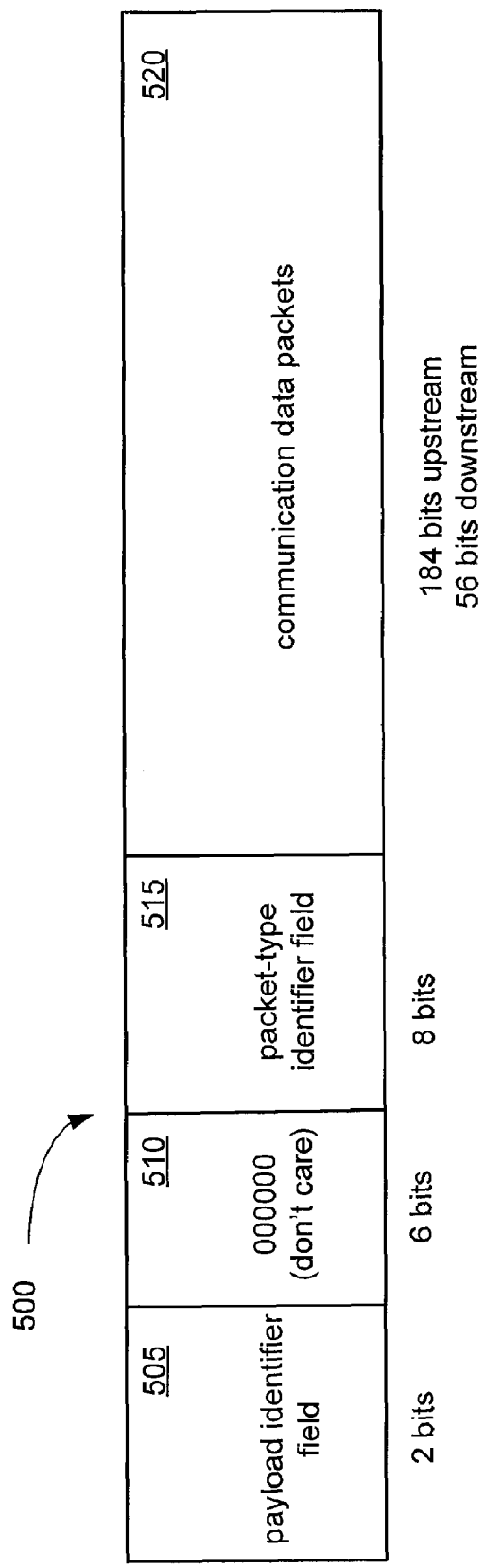
FIG. 5 illustrates a sub-frame of the packet frame, the sub-frame configured for transporting either voice data packets or communication data packets.

Referring now to FIG. 5, there is illustrated a hybrid sub-frame 500 that generally represents each of sub-frames H1-H8 described above. Hybrid sub-frame 500 contains several fields designated for carrying data bits having specific functions. Payload identifier field 505 is used to transport identifier bits that identify the nature of the data packet being carried in payload field 520. In one exemplary embodiment, payload identifier field 505 contains 2 data bits, thereby providing 4 unique bit combinations (00, 01, 10, and 11). Of these combinations, a first one (for e.g. 00) may be selected to identify the data packet carried in payload field 520 as being a voice data packet. A second combination (for e.g. 01) may be selected to identify the data packet carried in payload field 520 as being a communication data packet.

In the upstream direction, game console 110 receives a hybrid sub-frame, H1 for example, and processes the data bits contained in payload identifier field 505 to identify the nature of the data packet being carried in payload field 520. Similarly, in the downstream direction, wireless headset unit 100 receives a hybrid sub-frame, H5 for example, and processes the data bits contained in payload identifier field 505 to identify the nature of the data packet being carried in payload field 520. In one exemplary embodiment, the bit combination in the upstream payload identifier field is identical to that contained in the downstream payload identifier field. In another exemplary embodiment, the bit combinations used in the two opposite directions are different.

Furthermore, the data bits contained in payload identifier field 505 may default to a first combination that is indicative of the data packet carried in payload field 520 as being a voice data packet. Consequently, the bit combination in payload identifier field 505 has to be actively modified to a second combination when payload field 520 is used for transporting a communication data packet. Typically, transmission of communication data packets is prioritized over transmission of voice data packets. Consequently, voice data packets may be jettisoned so as to accommodate higher-priority communication data packets.

Don't care field 510 is currently unused and may be set to an all-zero combination of bits. Packet-type identifier field 515 is used to transport identifier bits that identify a specific functionality of a communication data packet being carried in payload field 520, when payload identifier field 505 is set to identify the nature of the data packet being carried in payload field 520 as a communication data packet. In one exemplary embodiment, packet-type identifier field 515 transports 8 data bits, thereby providing 256 unique bit combinations. Of these combinations, a first set of combinations may be set aside for downstream communications and a second set for the upstream direction.

In one implementation, three unique packet types have been defined—packet types 0, 1, and 2. Packet type 0 is defined for purposes of transmitting security-related requests and responses between game console 110 and wireless headset unit 100. For example, game console 110 transmits a downstream communications data packet in payload field 520 (with a packet 0 identifier in packet-type identifier field 515) requesting a response from an anti-piracy security (APS) device contained inside wireless headset unit 100. In response thereto, wireless headset unit 100 transmits an upstream communications data packet in payload field 520 (with a packet 0 identifier in packet-type identifier field 515).

Packet type 1 is defined for purposes of service discovery to set up a wireless voice link between wireless headset unit 100 and game console 110. Packet type 1 is also used for transmitting headset status information between game console 110 and wireless headset unit 100. For example, wireless headset unit 100 transmits an upstream communications data packet containing headset information in payload field 520 together with a packet 1 identifier in packet-type identifier field 515.

In response thereto, game console 110 transmits a downstream communications data packet in payload field 520 to acknowledge headset discovery, for example, with a packet 1 identifier in packet-type identifier field 515.

In a further example of a packet type 1 transaction, wireless headset unit 100 transmits an upstream communications data packet containing a service request initiated by a button depression in the wireless headset unit 100. Other service-related data packets relevant to packet 1 type of communications pertain to port assignments, operational modes, battery status, loopback testing, headset device ID, firmware version, and a rolling counter used for housekeeping in the headset.

Packet type 2 is defined for transportation of certain special commands and reports related to wireless headset unit 100. Table 2 below provides an exemplary list of commands and responses associated with a packet type 2 communications between an Xbox 360® and a wireless headset unit. Some of the commands and responses are carried out between a personal computer and a wireless headset unit.

TABLE 2

| Downstream Command | Upstream Response |
| --- | --- |
| Update headset status request | Current headset status |
| Headset VPort association request | Response report |
| Operational mode command (e.g. for setting powering state of headset) | Response will be via headset status |
| Read Parameter Block (e.g. command for reading a portion of a memory in the headset) | Parameter Block |
| Write Parameter Block (e.g. command for writing into a portion of a memory in the headset) | Write Parameter Block acknowledge |
| Silent Volume Control (e.g. command from PC to headset for changing the volume in the headset) | Response will be via normal volume control status response |
| PC Call Accept Request (e.g. command from PC to headset for playing the Call Accept tone in headset) | No wireless response |
| Read Serial Number (e.g command to headset for reading serial number stored in EEPROM) | Serial Number |
| Set Test Audio Loopback Mode | Headset status |
| Request PER report (e.g. command to headset for reading error statistics) | Response report |
| Read Link Drop Data (e.g. command to headset to return link drop statistics) | Response report (e.g. number of link drops) |
| Read Channel Array | Response report |
| Unassigned, no operation | Unassigned, no operation |

Attention is now drawn to payload field 520, which is used for transporting either voice data packets or communication data packets. As described above, when used for transporting communication data packets, the payload identifier field is suitably modified to indicate this payload. In one exemplary embodiment, the number of data bits contained in payload field 520 in the upstream direction is the same as the number of data bits contained in payload field 520 in the downstream direction. However, in another embodiment, the number of data bits carried in the two directions is not identical. For example, payload field 520 in the upstream direction may be configured to carry 184 bits from wireless headset unit 100 towards game console 110 and to carry 56 bits in the opposite downstream direction.

As described above (e.g. in Table 2) the communication data packets correspond to various types of information such as requests, responses, data values etc.

Figure 6:
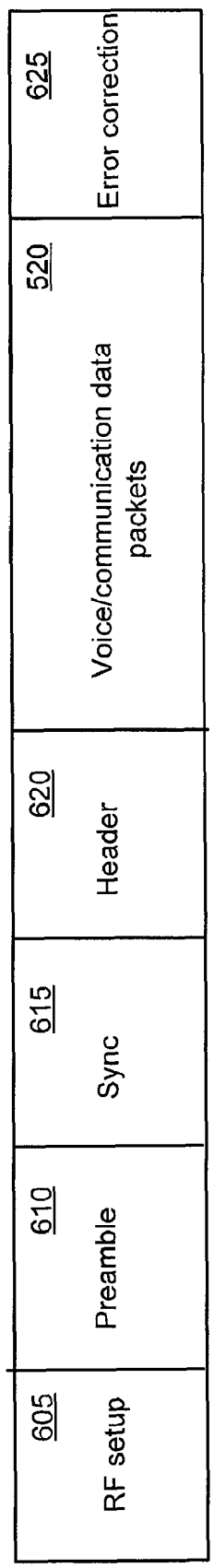
FIG. 6 illustrates additional data packets that are used in conjunction with the sub-frame of FIG. 5.

FIG. 6 illustrates some additional data packets that are used in conjunction with the hybrid sub-frame 410 described above. An optional RF Setup field 605 enables the host/device transceiver to switch from one mode (transmit/receive) to the other (receive/transmit) or change the transceiver frequency for frequency hopping. A preamble field 610 and synchronization field 615 are used by the receiver within the wireless headset unit 100 for clock and packet synchronization of the radio link. For example, 32-bit prolonged preamble transmissions may be used in combination with a preamble switched antenna instant receiver selection diversity algorithm implemented at the receiving end. This algorithm implies that the receiver during the first part of the preamble makes a first link quality estimate using one antenna, and during a second part makes a second estimate using the other antenna, and then, for the rest of the packet, selects the antenna which gave the highest quality estimate.

Synchronization field 615 is used by the receiving device to synchronize with the transmitting frequency and phase. The header field 620 of FIG. 6 includes the payload identifier field, the don't care filed, and the packet-type identifier fields (e.g., 505, 510, 515) described above. The data packets carried in payload field 520 contains voice data packets or communication data packets. Error-correction field 625 is configured according to the type of payload carried in payload field 520. For example, a cyclic redundancy code (CRC) may be used for detecting the packet error for voice data packets, whereas forward error correction (FEC) is used for communication data packets. Reed-Solomon forward error correction algorithm may be used here. The Reed-Solomon encoder takes the original data and adds extra "redundant" bits. Errors occur during the wireless transmission. The Reed-Solomon decoder processes the received data and attempts to correct errors and recover the original data. The number and type of errors that can be corrected depends on the characteristics of the Reed-Solomon code.

Figure 7:
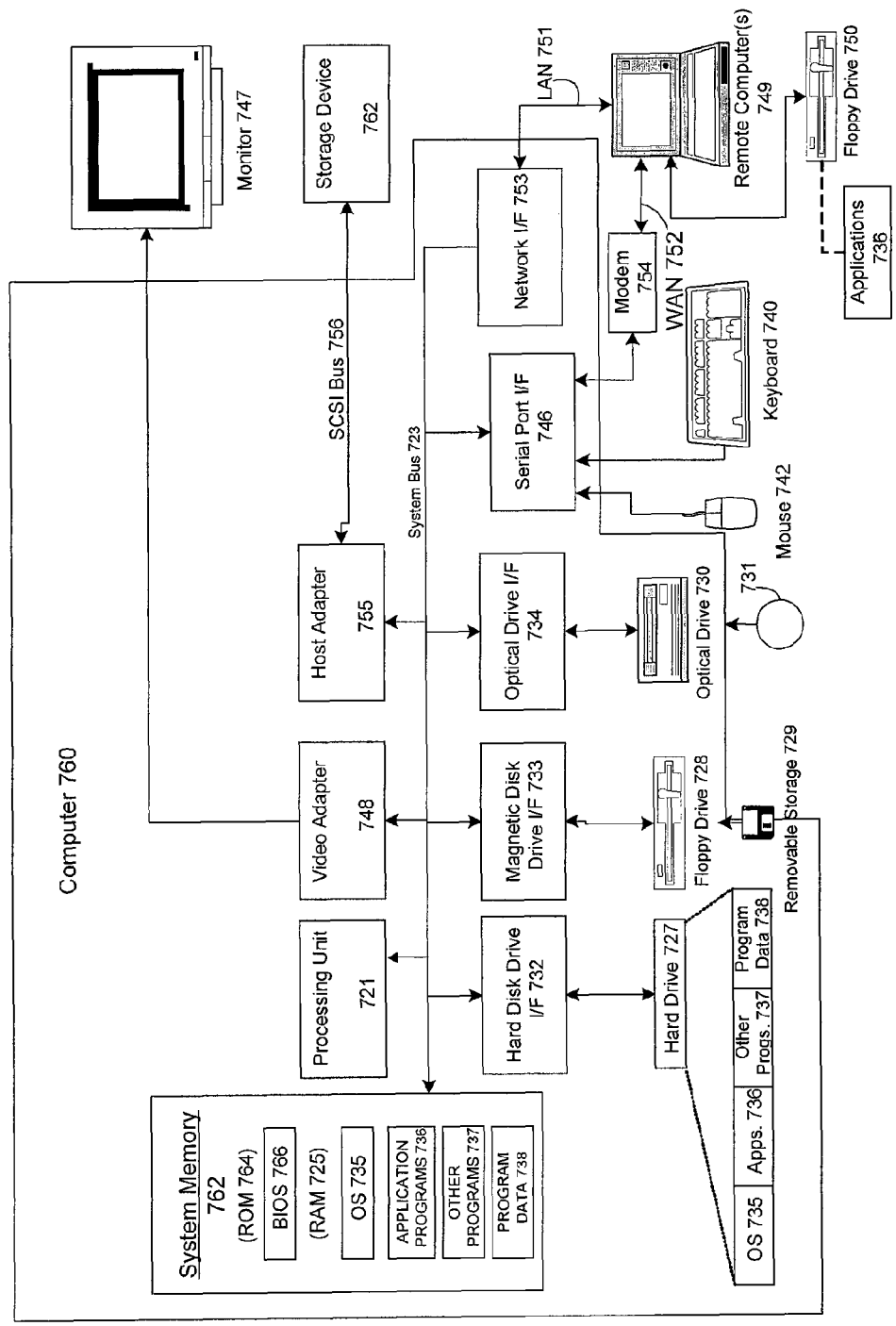
FIG. 7 is a depiction of a suitable computing environment in which a communication protocol for a wireless device and a game console can be implemented.

FIG. 7 and the following discussion provide a brief general description of a suitable computing environment in which a communication protocol for a wireless device and a game console in a gaming console can be implemented. Although not required, various aspects of a communication protocol for a wireless device and a game console in a gaming console can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of a communication protocol for a wireless device and a game console in a gaming console can be practiced with other computer system configurations, including hand held devices, multi processor systems, microprocessor based or programmable consumer electronics, network PCs, minicomputers, mainframe computers, and the like. Further, a communication protocol for a wireless device and a game console in a gaming console also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with a communication protocol for a wireless device and a game console in a gaming console as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 7, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 7 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 7. The logical connections depicted in FIG. 7 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of a communication protocol for a wireless device and a game console in a gaming console are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for a communication protocol for a wireless device and a game console in a gaming console, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a communication protocol for a wireless device and a game console in a gaming console.

The program(s) can be implemented in assembly or machine language, if desired. In any case, the language can be a compiled or interpreted language, and combined with hardware implementations. The methods and apparatuses for implementing a communication protocol for a wireless device and a game console in a gaming console also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of a communication protocol for a wireless device and a game console in a gaming console. Additionally, any storage techniques used in connection with a communication protocol for a wireless device and a game console in a gaming console can invariably be a combination of hardware and software.

While a communication protocol for a wireless device and a game console in a gaming console has been described in connection with the example embodiments of the various figures, it is to be understood that other similar embodiments can be used or modifications and additions can be made to the described embodiments for performing the same functions of a communication protocol for a wireless device and a game console in a gaming console without deviating therefrom. Therefore, a communication protocol for a wireless device and a game console in a gaming console as described herein should not be limited to any single embodiment, but rather should be construed in breadth and scope in accordance with the appended claims.

What is claimed:

1. A method of communicating information between a wireless headset unit and a game console, the method comprising:
   assigning in an upstream frame of data packets directed from the wireless headset unit to the game console, an upstream hybrid sub-frame for transporting upstream voice data packets and communication data packets; and
   replacing upstream voice data packets with communication data packets, the replacement being identified by insertion of a first set of identification bits into a payload identifier field of the upstream hybrid sub-frame, wherein:
   the upstream communication data packets are carried in a payload field of the upstream hybrid sub-frame; and
   an absence of the first set of identification bits in the payload identifier field of the upstream hybrid sub-frame indicates that the data packets carried in the payload field of the upstream hybrid sub-frame are upstream voice data packets.

2. The method of claim 1, further comprising:
   assigning in a downstream frame of data packets directed from the game console to the wireless headset unit, a downstream hybrid sub-frame for transportation of downstream voice data packets and communication data packets; and
   replacing downstream voice data packets with communication data packets, the replacement being identified by insertion of a first set of identification bits into a payload identifier field of the downstream hybrid sub-frame.

3. The method of claim 2, wherein an absence of the second set of identification bits in the payload identifier field of the downstream hybrid sub-frame indicates that the data packets carried in the payload field of the downstream hybrid sub-frame are downstream voice data packets.

4. The method of claim 3, wherein the first set of identification bits is identical to the second set of identification bits.

5. The method of claim 4, wherein each of the first and second sets of identification bits contains two data bits.

6. The method of claim 2, further comprising:
   inserting in a packet-type identifier field of the upstream hybrid sub-frame, a first set of classification bits that defines the type of information carried in the upstream communication data packets.

7. The method of claim 6, further comprising:
   inserting in a packet-type identifier field of the downstream hybrid sub-frame, a second set of classification bits that defines the type of information carried in the downstream communication data packets.

8. The method of claim 7, wherein the payload field of the upstream hybrid sub-frame contains a greater number of bits than the payload field of the downstream hybrid sub-frame.

9. A communication system comprising:
   a wireless headset unit comprising an upstream hybrid sub-frame for transportation of upstream voice data packets and communication data packets, the upstream sub-frame comprising an upstream payload identifier field configured to transport a first set of identification bits indicative of a replacement of upstream voice data packets with upstream communication data packets; and
   a game console configured to receive the upstream hybrid sub-frame of data packets transmitted by the wireless headset unit, the game console further configured to transmit a downstream frame of data packets to the wireless headset unit, the downstream frame of data packets containing a downstream hybrid sub-frame for transportation of downstream voice data packets and communication data packets, the downstream hybrid sub-frame comprising a downstream payload identifier field configured to transport a second set of identification bits indicative of a replacement of downstream voice data packets with downstream communication data packets, wherein:
   the upstream communication data packets are carried in a payload field of the upstream hybrid sub-frame; and
   an absence of the first set of identification bits in the payload identifier field of the upstream hybrid sub-frame indicates that the data packets carried in the payload field of the upstream hybrid sub-frame are upstream voice data packets.

10. The communication system of claim 9, wherein the downstream hybrid sub-frame comprises a downstream payload field configured to carry the downstream voice data packets.

11. The communication system of claim 10, wherein the wireless headset unit is configured to extract the upstream communication data packets from the upstream payload field upon detection of the first set of identification bits in the upstream payload identifier field; and to extract the upstream voice data packets from the upstream payload field when the first set of identification bits is not present in the upstream payload identifier field.

12. The communication system of claim 11, wherein the game console is configured to extract the downstream communication data packets from the downstream payload field upon detection of the second set of identification bits in the downstream payload identifier field; and to extract the downstream voice data packets from the downstream payload field when the second set of identification bits is not present in the downstream payload identifier field.

13. The communication system of claim 9, wherein the upstream and downstream frames of data packets are transported in a Time Division Multiple Access (TDMA) wireless format.

14. A computer-readable storage medium having stored thereon computer-executable instructions for providing communications between a wireless headset unit and a game console by performing the steps of:
- configuring an upstream hybrid sub-frame for transportation of upstream voice data packets from the wireless headset unit to the game console; and
- inserting in a payload identifier field of the upstream hybrid sub-frame, a first set of identification bits indicative of a replacement of upstream voice data packets with upstream communication data packets, wherein:
- the upstream communication data packets are carried in a payload field of the upstream hybrid sub-frame; and
- an absence of the first set of identification bits in the payload identifier field of the upstream hybrid sub-frame indicates that the data packets carried in the payload field of the upstream hybrid sub-frame are upstream voice data packets.

15. The computer-readable medium of claim 14, additionally comprising computer-executable instruction for performing the steps of:
- configuring a downstream hybrid sub-frame for transportation of downstream voice data packets from the game console to the wireless headset unit; and
- inserting in a payload identifier field of the downstream hybrid sub-frame, a second set of identification bits indicative of a replacement of downstream voice data packets with downstream communication data packets.

16. The computer-readable medium of claim 15, additionally comprising computer-executable instruction for performing the steps of:
- extracting the upstream communication data packets from the upstream payload field upon detection of the first set of identification bits in the upstream payload identifier field; and
- extracting the upstream voice data packets from the upstream payload field when the first set of identification bits is not present in the upstream payload identifier field.

17. The computer-readable medium of claim 16, additionally comprising computer-executable instruction for performing the steps of:
- extracting the downstream communication data packets from the downstream payload field upon detection of the second set of identification bits in the downstream payload identifier field; and
- extracting the downstream voice data packets from the downstream payload field when the second set of identification bits is not present in the downstream payload identifier field.

18. The computer-readable medium of claim 17, additionally comprising computer-executable instruction for performing the steps of:
- inserting in a packet-type identifier field of the upstream hybrid sub-frame, a first set of classification bits that defines the type of information carried in the upstream communication data packets.

* * * * *